UNITED STATES PATENT OFFICE.

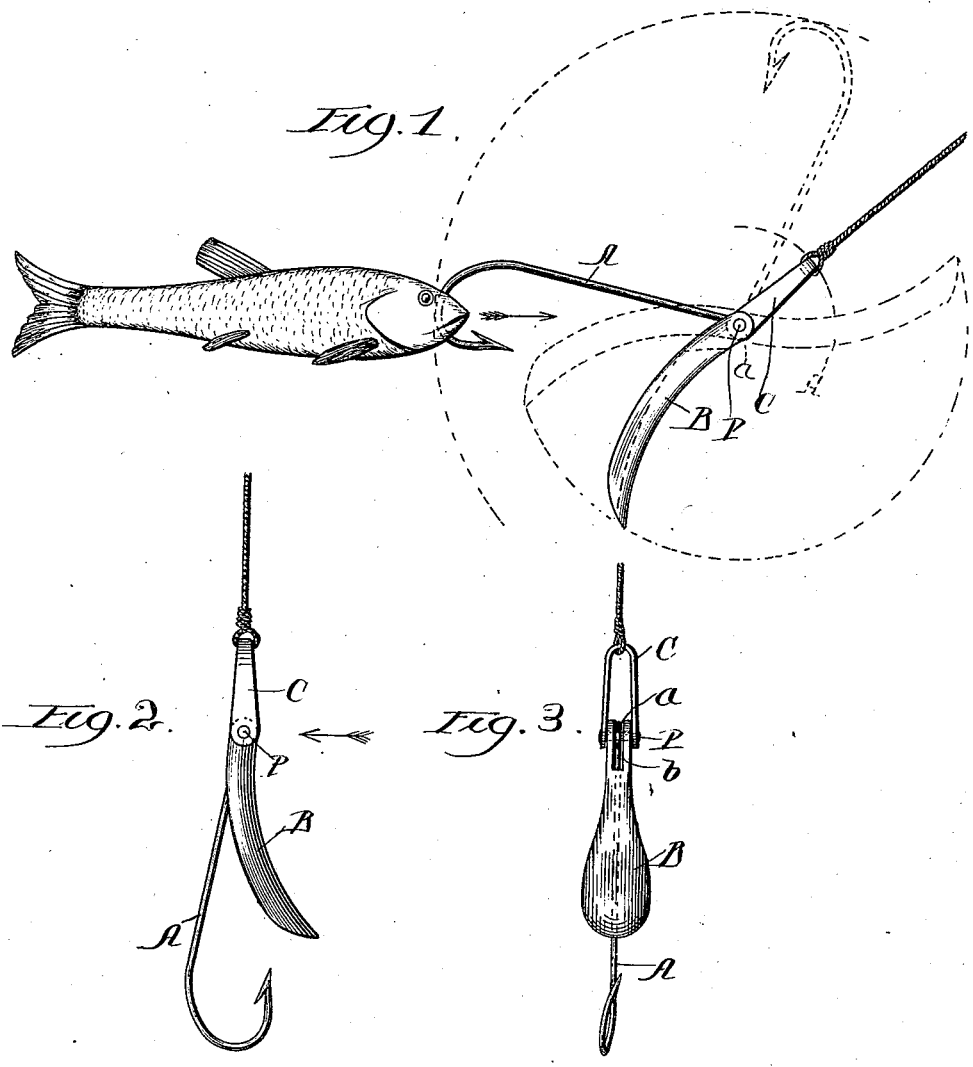
(No Model.) J. R. PAYSON. 3 Sheets—Sheet 1.
GUARD FOR FISH HOOKS.
No. 512,746. Patented Jan. 16, 1894.

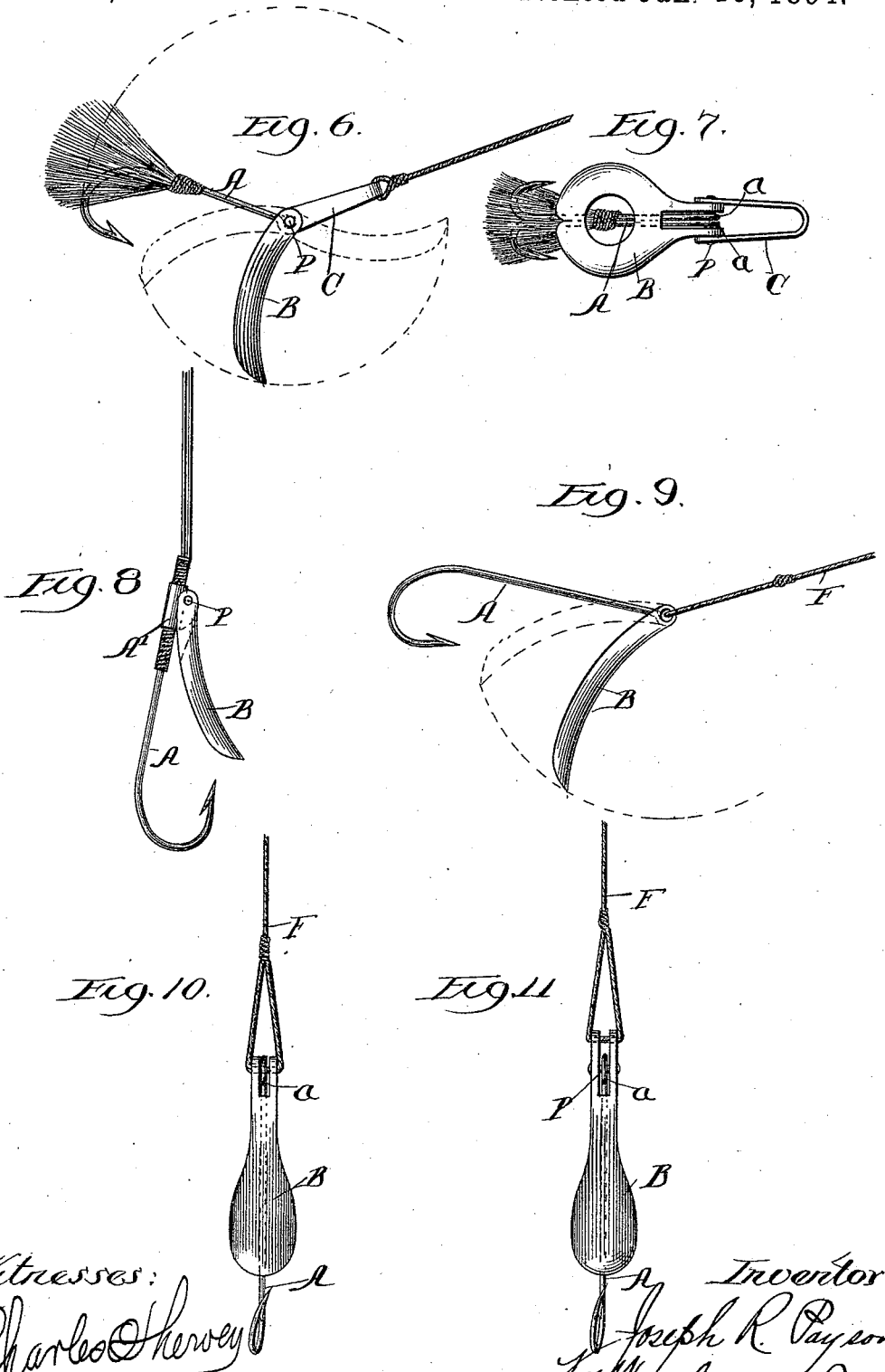

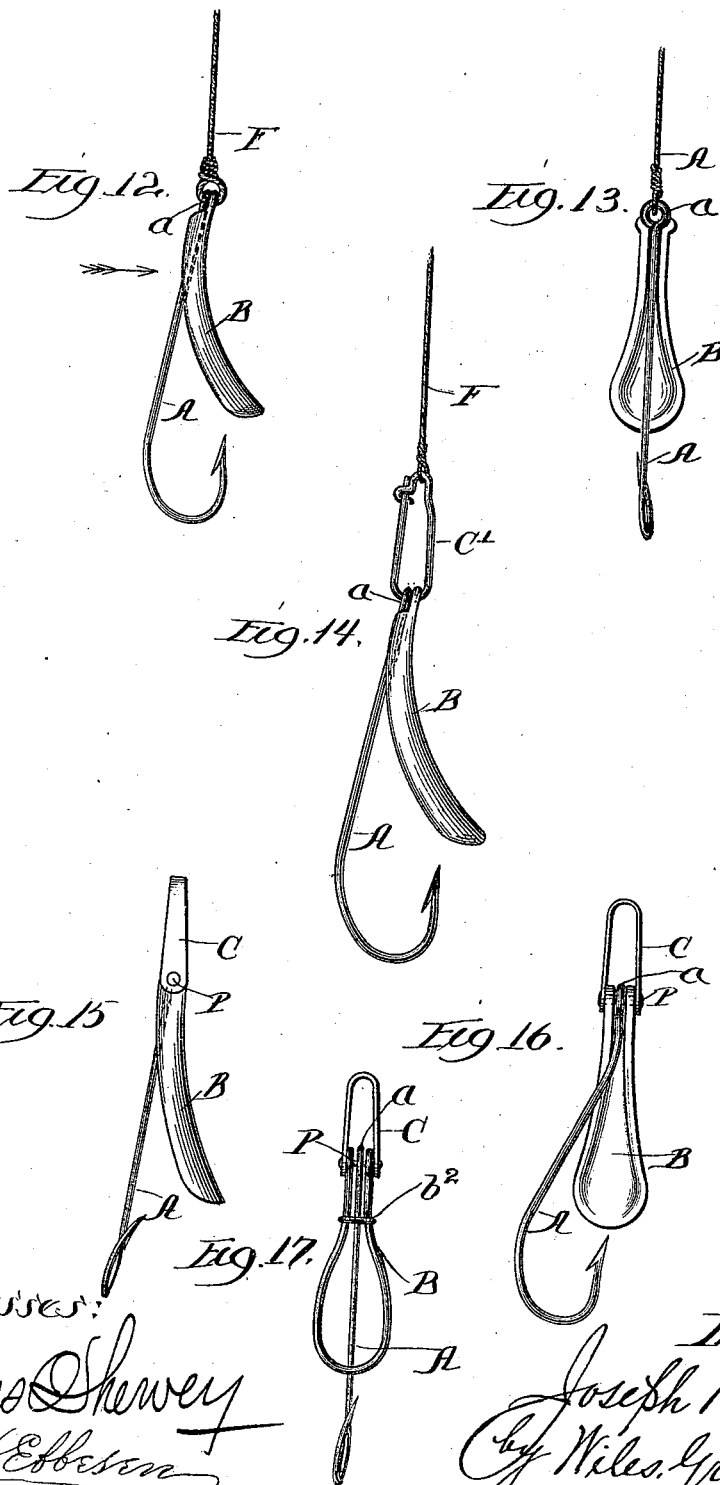

JOSEPH R. PAYSON, OF CHICAGO, ILLINOIS.

GUARD FOR FISH-HOOKS.

SPECIFICATION forming part of Letters Patent No. 512,746, dated January 16, 1894.

Application filed March 20, 1893. Serial No. 466,768. (No model.)

*To all whom it may concern:*

Be it known that I, JOSEPH R. PAYSON, a citizen of the United States of America, residing at Chicago, in the county of Cook and State of Illinois, have invented certain new and useful Improvements in Guards for Fish-Hooks, of which the following is a specification.

My invention relates to improvements in guards for fish-hooks, the principal object of the invention being to provide a guard attached or adapted to be attached to a fish-hook, and when so attached, to automatically prevent the accidental engagement of the hook with weeds, or other obstructions, at the same time leaving it fully exposed to seizure by a fish.

Another object of the invention is to so construct and attach the guard that it may form a sinker and a non-rotating lure adapted to attract the fish, hold the hook and bait in position and prevent twisting of the line and thereby obviate the necessity for a swivel.

A further object of the invention is to so connect and arrange the hook and non-rotating guard that the point of the hook may be constantly turned downward and held in the most favorable position for hooking the fish.

Another object of the invention is to so arrange the guard in relation to the hook as to prevent the swallowing of the hook, or the biting of the line by a fish; and still another object is to simplify the fishing outfit, dispensing with a great share of the usual stock of separate hooks, snells, leaders, sinkers, swivels and lures, and to furnish a compact and durable device adapted for casting, trolling or still-fishing with real or artificial bait in clear or weedy water.

The invention is fully described and explained in the specification and shown in the accompanying drawings, in which—

Figure 1 is a side elevation of a device embodying my invention, a single hook being connected with the guard and all the parts being shown in trolling position with a minnow on the hook. Fig. 2 is a side elevation of the device shown in Fig. 1, the parts being suspended by the line attached to the device. Fig. 3 is a front elevation of the device shown in Fig. 2, the view being in the direction indicated by the arrow in said figure. Fig. 4 is a longitudinal vertical section of the guard shown in the previous figures. Fig. 5 is a vertical section of the line loop. Fig. 6 is a side elevation of a modification of my device in which the single hook is replaced by two hooks and the guard is correspondingly broadened. Fig. 7 is a bottom plan of the device shown in Fig. 6. Fig. 8 is a side elevation of a modification in which a snell hook is substituted for the ring hook shown in Fig. 1. Fig. 9 is a side elevation of a device in which the hook and guard are pivoted together by passing the line through the end of the guard and through the ring at the end of the shank of the hook, the parts being shown in trolling position. Fig. 10 is a front elevation of the same device, the parts being suspended by the line. Fig. 11 is a front elevation of another modification, in which the hook is connected with the guard by the metal pivot, but the guard is connected with the line by passing the latter through the end of the former, the ring at the end of the shank of the hook in this figure and in each of the hooks shown in Figs. 1, 2, 3, 6, 7, 9 and 10, being in the plane of the hook. Fig. 12 is a side elevation of a modification in which the ring of the hook is in a plane at right angles to the plane of the hook, and the guard is fastened to the hook by passing the line through the ring and through the end of the guard. Fig. 13 is a rear elevation of the device shown in Fig. 12, the view being in the direction indicated by the arrow in said figure. Fig. 14 is a side elevation of a modification in which the hook and guard are of the same form and in the same relation as those shown in Fig. 12, the parts being connected, however, by a wire loop in the general form of what is known as a safety-pin. Fig. 15 is a side elevation of a modification in which the eye at the end of the shank of the hook is in a plane at right angles to the plane of the hook, and the guard is so attached as to swing in the plane of the eye instead of in the plane of the hook. Fig. 16 is a rear elevation of the device shown in Fig. 15. Fig. 17 shows a modified guard.

In Figs. 1 to 5, which illustrate my preferred construction, A is a hook of ordinary and well known form, except that the ring, or eye, *a*, at the upper end of its shank is formed in a plane passing through the point of the hook and coincident with the general plane of the bent portion of the hook instead of being at right angles to that plane as in the hooks usually found in the market. The ring of a hook is embraced by the bifurcated upper end of a swinging guard, B, the end of the guard being formed with a slot, $b$, adapted to receive the ring and a portion of the shank; and the end of the guard is, in turn, embraced by the rear ends of the two members of a loop, C, formed from a strip of sheet metal, the front end of the loop being formed by bending the strip and being adapted to receive the end of a line as shown in the drawings. The upper end of the guard is formed with a transverse perforation, $b'$, and the rear end of the loop, C, is formed with a corresponding perforation, $c$, the two perforations, $b'$, $c$, being coincident with the ring, $a$, of the hook and all the parts being united by a transverse pivot, P, passing through the perforations and the ring. All the parts connected by the pivot swing freely upon it, and when the line and loop are in a straight line as in the trolling position illustrated in Fig. 1, the guard, B, is free to swing in a vertical plane between the two limits indicated by dotted lines, and the hook is free to swing in a vertical plane from its position shown in full lines to that shown in dotted lines. The oscillation of the hook and guard toward each other is limited by the formation of the slot, $b$, in the guard, B, the point, $b^2$, at the bottom of the slot being adapted to serve as a stop for the hook and prevent nearer approach of the guard to the hook than that illustrated in Fig. 2. The guard is of such weight as to serve as a sinker and hold the hook at the proper depth below the surface of the water, and its front face is of such symmetrical form as to prevent its rotation as it is drawn through the water in trolling. Its weight and form tend, therefore, to hold it in an approximately vertical position varying, however, with the rate of motion of the hook and guard through the water. When the device is in the suspended position shown in Fig. 2, as in still-fishing, the hook hangs in the vertical plane of the guard with its point turned upward; but when the device is drawn through the water as in trolling, especially if a bait be fastened on the hook as shown in Fig. 1, the hook and bait assume an approximately horizontal position, the bait being held constantly in proper position, and the hook being still in the vertical plane of the guard, and its point being turned downward and in the most favorable position for hooking a fish as it takes the bait. At the same time, the guard is free to swing away from the hook to any position within its limits of motion, and the hook is free to swing away from the guard to any position within its angle of oscillation. The parts thus have such freedom of movement as to offer no obstacle whatever to the hooking or handling of the fish. The position and size of the guard are such as to prevent in almost every case the swallowing of the hook and the biting of the line by the fish. The front face of the guard is preferably of convex cross-section and this form tends to give the guard, the hook and the bait a waving motion in their passage through the water, and I prefer also to give the guard a highly polished surface which together with its motion makes it an attractive lure and adds greatly to the efficiency of the bait. The guard is so formed and attached to the hook that its central plane passes through the point of the hook, and its free end is so broadened that when it is at its nearest limit of movement toward the hook it effectually guards the point of the hook against engagement with any sort of obstacle in the water. When the parts are in the position shown in Fig. 2, they may be drawn by means of the loop, C, across or through weeds, grass, or other obstructions without possibility of fouling or entanglement, so that it is possible to draw the hook freely through any water however filled with such obstructions as are found in nearly all fishing grounds. When the parts are in the trolling position shown in Fig. 1, the guard is below and in front of the hook, and it, therefore, strikes in advance of the hook any obstruction which may be encountered in the way. As soon as the guard strikes the obstruction, it swings toward the hook to the limit shown in dotted lines in Fig. 1, and both hook and guard slide freely over the obstruction, whatever its nature may be. As soon as the obstruction is passed, the guard drops down again to its normal trolling position and remains therein so long as it moves unobstructed through the water. It will be observed that the guard, B, is nearest the point of the hook at the time when it is actually protecting the latter, and that in swinging away from the point of the hook, it swings outward and not inward. In fact, if the guard connected with the hook in the manner shown in Fig. 1, were allowed to swing toward the hook until its free end passed beyond the point of the hook, the value of the guard as a protection for the point of the hook would be lost and the hook would be free to engage any obstruction over which the guard might pass.

In the device shown in Figs. 6 and 7, two hooks of substantially the same construction as the single hook shown in Fig. 1, are pivoted to the upper or front end of a guard like the guard shown in Fig. 1, except that its free end is broadened in order to protect the points of the two hooks which are separated by a considerable space. The hooks in this device are shown in combination with an artificial bait of ordinary material and construction.

Fig. 8 shows a modification in which the ringed hook shown in Fig. 1, is replaced by a snell hook of well known form. The guard is attached to the hook by means of a sleeve, A', encircling the upper portion of the shank of the hook, this sleeve being embraced by the slotted front end of the guard, and the sleeve and guard being connected by a pivot, P.

Figs. 9 and 10 illustrate a device in which the line loop, C, is dispensed with and the hook and guard which are of the same construction as the corresponding parts in Fig. 1, are pivoted together by means of the line which passes through the perforation in the end of the guard and through the ring of the hook.

Fig. 11 shows a modification in which the upper end of the guard is formed with two perforations, one of which serves to receive the pivot which passes through the ring of the hook, while the other receives the line F.

Figs. 12 and 13 show a modification in which the eye, $a$, of the hook is in a plane at right angles to the plane of the hook and the perforation in the upper end of the guard is at right angles to the face of the guard and coincident with the opening in the ring, the guard and hook being fastened together by means of the line which is passed through them and serves as a pivot about which they may swing with reference to each other.

Fig. 14 shows another modification in which the hook and guard have the same forms as those shown in Figs. 12 and 13, the two being, however, fastened together by means of a loop, C′, one of whose ends is formed with a hook adapted to clasp the opposite end as shown, the upper or front end of the loop being adapted to receive the line.

Figs. 15 and 16 show still another modification in which the ring of the hook is in a plane passing through the point of the hook and at right angles to the plane of the hook. The slotted upper end of the guard embraces the ring and is fastened to it and to the line loop in the same manner as shown in Fig. 1. The slot, which receives the ring and a portion of the shank of the hook, is deflected as shown in Fig. 16, to accommodate the bent shank of the hook. In this construction, the guard swings in a plane passing through the point of the hook, but at right angles to the plane of the bent portion of the hook.

The operation of all the forms shown in Figs. 6 to 16 is the same as that in the device shown in Fig. 1 and need not be further described. In all the forms, the guard accomplishes fully all the objects of the invention since it serves as a perfect automatic protection for the point of the hook, and, at the same time acts as a sinker, forms a most attractive lure, holds the hook constantly in the most favorable position and greatly simplifies the outfit required for various kinds of fishing in every sort of water and under the most difficult circumstances.

Fig. 17 illustrates a modification differing from the form shown in Fig. 1, in having a guard formed from a rod bent into suitable form and formed with eyes at its ends corresponding in position to the perforations in the upper end of the solid guard. The rod or wire, of which this guard is composed, may be of any desired cross-section and is evidently extremely cheap and simple of construction and operates precisely the same as the solid guard. In order that the movement of the guard toward the hook may be limited as in the other forms illustrated, the guard shown in this figure, is provided with a transverse loop, $b^2$, placed at a suitable distance below its upper end and adapted to strike the shank of the hook when the parts reach their proper position. This transverse loop may be either of wire wrapped about the arms of the guard, or piece of metal formed with holes and slipped unto the arms before the eyes are formed in their ends.

Having now described and explained my invention, what I claim as new, and desire to secure by Letters Patent, is—

1. A guard adapted to be pivoted at one end to the shank of a fish-hook and to oscillate in a plane passing through the point of the hook.

2. The combination with a fish-hook, of a guard pivoted at its upper end to the shank of the hook and free to oscillate upon its pivot in a plane passing through the point of the hook.

3. The combination with a fish-hook formed with a ring at the upper end of its shank, of a guard pivoted at its upper end to said ring and free to oscillate in a plane passing through the point of the hook.

4. The combination with a fish-hook, of a guard pivoted at its upper end to the shank of the hook and free to swing in a plane passing through the point of the hook, the guard being provided with a stop limiting the motion of the guard toward the hook whereby the free end of the guard as it approaches the hook is prevented from passing beyond the point of the hook.

5. The combination with a fish-hook, of a metal guard pivoted at its upper end to the shank of the hook, and free to oscillate in a plane passing through the point of the hook, the guard being adapted by its weight to serve as a sinker.

6. The combination with a fish-hook, of a metal guard pivoted at its upper end to the hook and free to oscillate about its pivot in a plane passing through the point of the hook, but guarded against rotation about the shank of the hook, the weight of the guard being adapted to hold it in a vertical plane, and the hook being constantly held in the same relation to said vertical plane.

7. The combination with a fish-hook, of a metal guard pivoted at its upper end to the shank of the hook and free to oscillate in a plane upon its pivot, but not to rotate upon the shank of the hook, the weight of the guard being adapted to hold it in a vertical plane and the plane of the body of the hook being constantly coincident with the plane of oscillation of the guard.

8. The combination with a fish-hook having at the upper end of its shank a ring formed in the plane of the body of the hook, of a metal guard pivoted to said ring and free to oscillate in the plane thereof, the weight of the guard being adapted to hold it and the hook in a vertical plane.

9. The combination with a fish-hook, of a polished metal guard pivoted at its upper end to the shank of the hook and free to oscillate in a plane passing through the point of the hook, the guard being adapted by its shape and surface to serve as a lure and its free end being adapted to protect the point of the hook.

10. The combination with a fish-hook, of a polished metal guard pivoted at its upper end to the shank of the hook and free to swing in a plane passing through the point of the hook, but not to rotate about the shank of the hook, the guard being adapted by its weight to serve as a sinker and by its surface to serve as a lure.

11. The combination with a fish-hook, of a metal guard pivoted at its upper end to the shank of the hook, the upper end of the guard having in the face next the shank of the hook, a longitudinal slot adapted to receive a portion of the shank and to serve as a guide and stop regulating and limiting the oscillation of the guide and hook with reference to each other.

12. The combination with a fish-hook formed with a ring at the upper end of its shank, of a guard formed at its upper end with perforations coincident with said ring, a line loop formed with perforations coincident with the perforation in the guard, and a pivot passing through said perforations and said ring and connecting the line loop guard and hook; substantially as shown and described.

13. The combination with a fish-hook having at the end of its shank a ring formed in the plane of the body of the hook, of a guard pivoted at its upper end to the ring and free to oscillate in the plane of the body of the hook, the weight of the guard being adapted to hold it constantly in a vertical plane, and the hook being placed with its point toward the guard, whereby when the hook and guard are drawn through the water, and the shank of the hook is approximately horizontal, the point may be turned downward.

JOSEPH R. PAYSON.

Witnesses:
   CHARLES O. SHERVEY,
   R. H. WILES.